INVENTORS.
ALBERT R. SNIDER
BY DAVID M. ROBERTS

Caesar, Rivise, Bernstein & Cohen
ATTORNEYS.

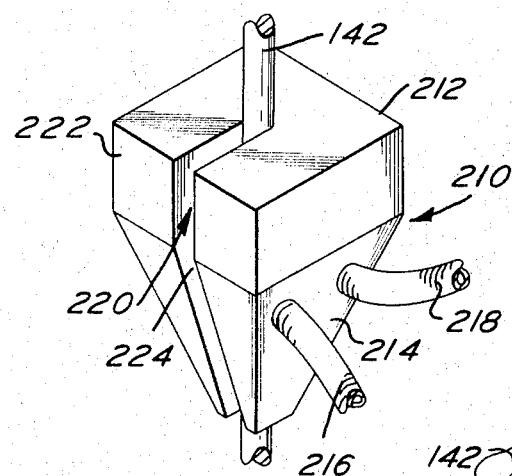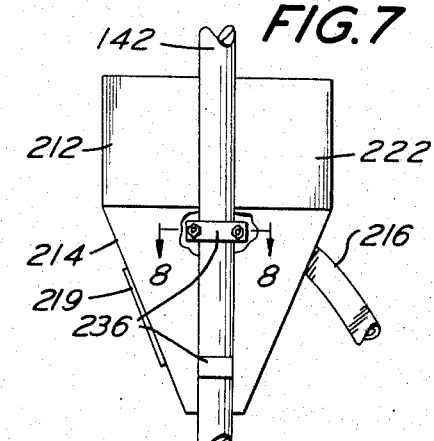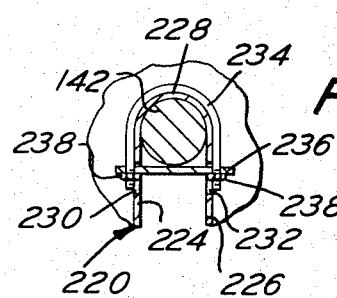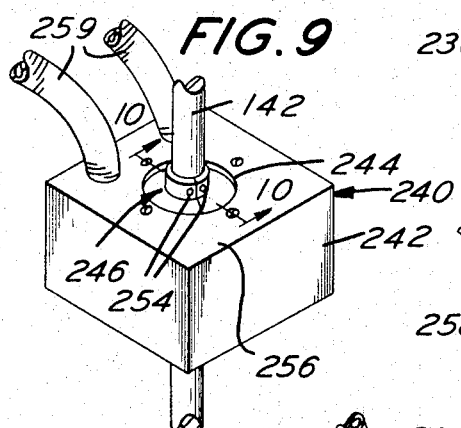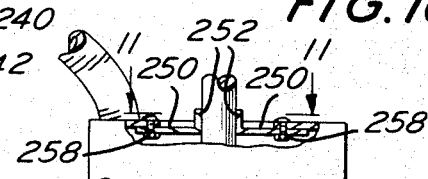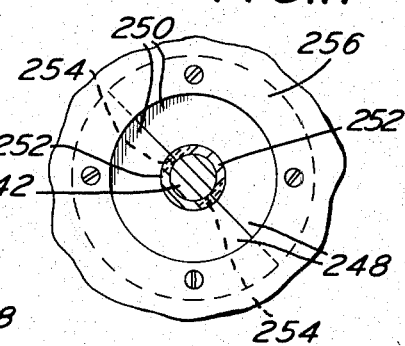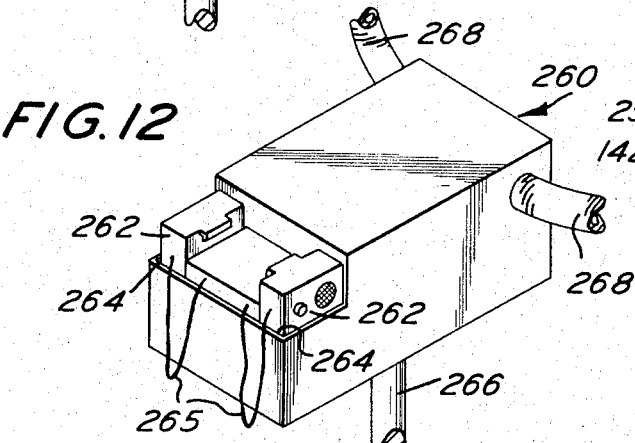

United States Patent Office 3,360,954
Patented Jan. 2, 1968

1

3,360,954
DETACHABLE AIR CONDITIONER FOR PARKED AUTOMOBILE
Albert R. Snider, Clearwater, and David M. Roberts, Clearwater Beach, Fla., assignors to Parkaire Engineering Company, Tampa, Fla., a corporation of Florida
Filed Dec. 6, 1965, Ser. No. 511,733
11 Claims. (Cl. 62—259)

ABSTRACT OF THE DISCLOSURE

An air conditioning system for use in a drive-in theater which includes a plurality of spaced individual air conditioning units, each of which includes a self-contained refrigeration system. The air conditioning units are each provided at locations in the theater for cooling the adjacent vehicles. Each of the units includes means for distributing cooled air to each of the vehicles adjacent the units.

This invention relates generally to drive-in theaters and more particularly to a system for air conditioning vehicles parked at a drive-in.

In many areas, drive-in theaters are extremely uncomfortable due to the environment in which they are located. That is, in various portions of the country, the temperatures at night are often too warm to comfortably sit through a movie; or even where temperatures are not uncomfortably warm, there is the problem of open windows in the car allowing insects and bugs access to the passengers in the automobile.

In the past, it has been suggested that a centrally located air conditioner be used in a drive-in system. However, the central air conditioner requires a large central air conditioning unit, insulating piping or ducting to the parked vehicles to transmit the cooled air or conditioned media, electrical blowers and mechanical valving at the outlet next to the cars. It is thus seen that providing such a system in a drive-in theater requires a sizeable capital investment. This investment is completely lost if the drive-in theater does not prove a profitable venture and, further, on "off" nights, the entire system must be used to air condition only a few cars. Finally, where a drive-in theater is presently in operation, installation of such a system is extremely expensive in that it requires excavation of the premises to place the insulating piping or ducting underground throughout the drive-in theater.

It is, therefore, an object of this invention to overcome the aforementioned disadvantages.

Another object of the invention is to provide a new and improved air conditioner to provide cooled air to parked vehicles.

Another object of the invention is to provide a new and improved air conditioning unit which may be mounted to existing speaker poles to provide conditioned air to the vehicles adjacent said pole.

Another object of the invention is to provide a new and improved air conditioning system for a drive-in theater which includes a means for receiving the speaker poles and means for securing the unit thereto.

Another object of the invention is to provide a new and improved air conditioning system for a drive-in theater which requires only electrical outlet services.

Another object of the invention is to provide a new and improved air conditioning unit of a novel configuration to allow mounting thereof on existing speaker poles.

The aforementioned as well as other objects of the present invention are achieved by providing in a drive-in theater, a plurality of spaced speaker poles, a plurality of spaced air cooling units, each of said units mounted on one of said speaker poles, said units each including a compressor, said units further including means for distribution of cooled air to the adjacent vehicles.

Other objects and many of the attendant advantages of this invention will be readily appreciated as the same becomes better understood by reference to the following detailed description when considered in connection with the accompanying drawing wherein:

FIG. 5 is a sectional view taken along the line 5—5 in FIG. 2;

FIG. 5A is a sectional view taken along the line 5A—5A in FIG. 5;

FIG. 6 is a perspective view of an alternate air conditioning unit embodying the invention;

FIG. 7 is a side elevational view of an alternate air conditioning unit with parts removed in order to show details more clearly;

FIG. 8 is a sectional view taken along the line 8—8 in FIG. 7;

FIG. 9 is a perspective view of another alternate embodiment of the air conditioning unit embodying the invention;

FIG. 10 is a fragmentary side elevational view of the second alternate embodiment with parts shown in vertical section to more clearly show details of construction;

FIG. 11 is a sectional view taken along the line 11—11 in FIG. 10; and

FIG. 12 is another embodiment of the air conditioning unit including integral speaker units.

Figure 1:
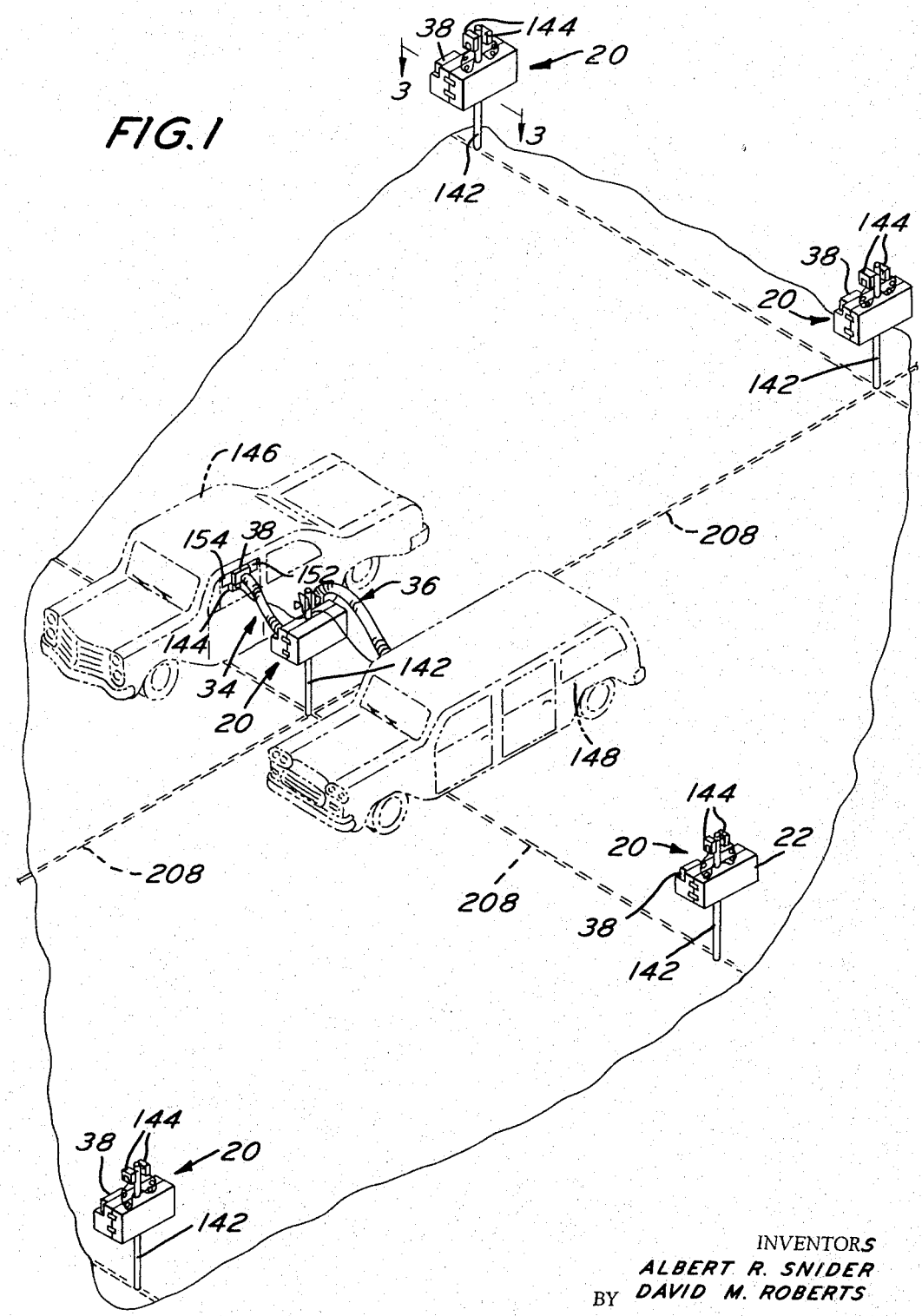
FIG. 1 is a fragmentary perspective view of a drive-in theater embodying the invention.

Referring now in greater detail to the various figures of the drawing wherein similar reference characters refer to similar parts, air conditioning units for a drive-in theater embodying the present invention are generally shown at 20 in FIG. 1. Device 20 basically comprises a two piece case 22 which houses therein a compressor 24, an evaporator coil 26, a condenser coil 28, a pair of blower/fan motor assemblies 30 and 32 and a pair of distribution hoses 34 and 36, and a pair of window distribution and deflector units 38.

Figure 2:
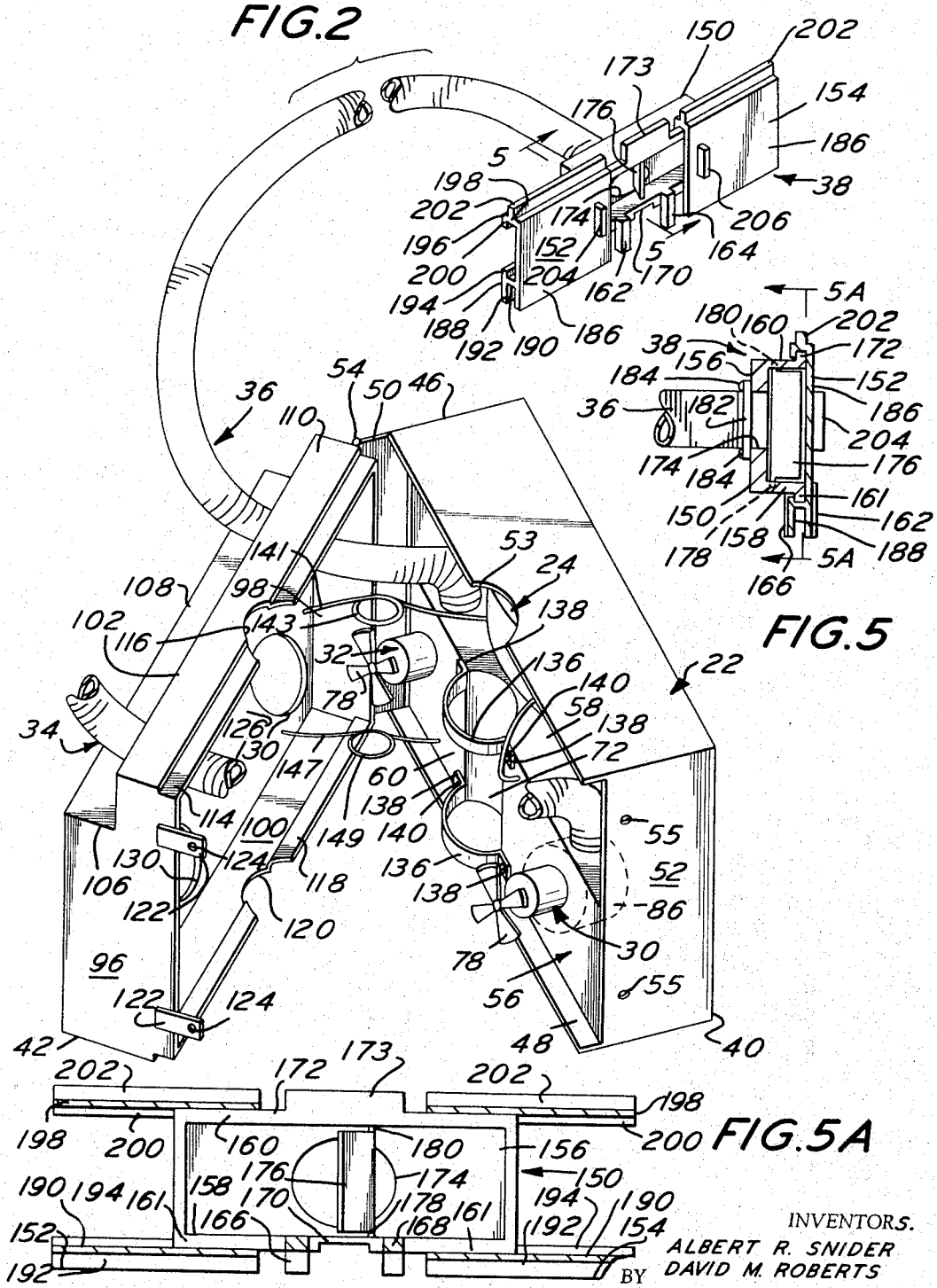
FIG. 2 is a perspective view of an air conditioning unit embodying the invention.

The case 22 includes a first compartment section 40 and a second compartment section 42. Section 40 includes a rectangular side wall 44, a top wall 46, a bottom wall 48 and a pair of end walls 50 and 52. Walls 44 through 52 are integral and form a housing for the compressor 24, the evaporator coil 26 and the blower/fan motor assemblies 30 and 32. As best seen in FIG. 2, the top and bottom walls 46 and 48, respectively, are rectangular and include at their free edge arcuate notches 53 which are centrally located along the free edge. End wall 50 is also rectangular and wider than rectangular walls 46 and 48. A vertical edge of wall 50 is secured to section 42 by a hinge 54 which extends along the edge. Wall 52 extends between top and bottom walls 46 and 48, respectively, and is slightly narrower in width than these walls. Wall 52 includes a pair of holes 55 which are adapted to receive a suitable fastener to lock the sections 40 and 42 together.

As best seen in FIG. 2, compartment section 40 further includes a blower compartment 56 which includes a top wall 58 and a side wall 60. Wall 58 is rectangular and includes an integral flange 62 which is secured to side wall 44 of the compartment. Wall 60 is also rectangular and includes an integral flange 64 which is secured to bottom wall 48. Top wall 58 is perpendicular to the side wall 44 and side wall 60 is perpendicular to bottom wall 48 and extends between end walls 50 and 52 and is perpendicular thereto. Side wall 60 also includes a pair of vertical flanges 66 and 68. Vertical flange 66 is secured to end wall 50 and vertical flange 68 is secured to end wall 52. Top wall 58 includes an arcuate notch 70 which is vertically aligned with notches 53 in top and bottom walls 46 and 48, respectively. Wall 60 includes a vertically extending arcuate channel 72 which is also vertically aligned with notches 53 and 70. The blower compartment 56 extends from bottom wall 48 approximately two-thirds of the height of the section 40. Compressor 24 is mounted in the space defined by top wall 58 of the compartment 56 and top wall 46 of section 40. Compressor 24 is secured to the top wall 58 of the blower compartment by fasteners 74.

Figure 3:
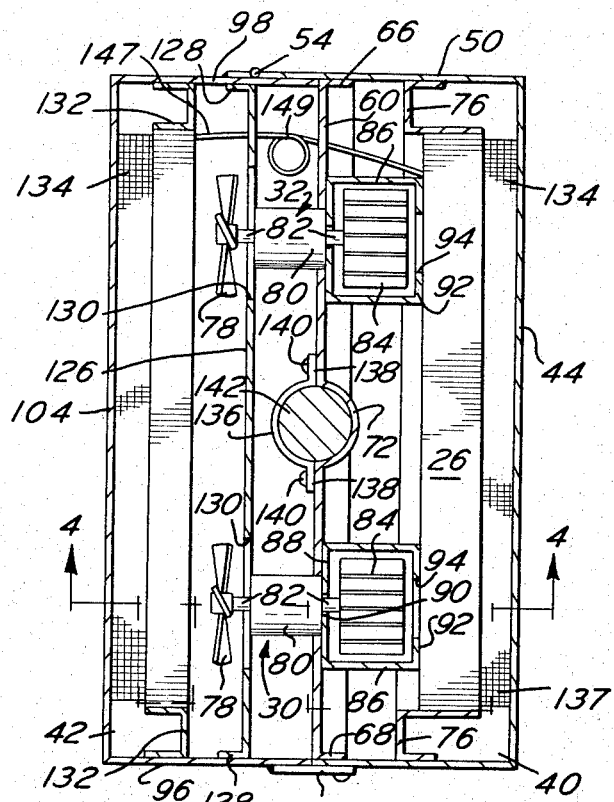
FIG. 3 is a sectional view of the air conditioning unit taken along the line 3—3 in FIG. 1.

Evaporator coil 26 is mounted within the blower compartment 56. It is maintained in place by a U-shaped rail 76 which extends along the vertical sides and along the bottom side of the evaporator coil. The inner leg of the U-shaped rail 76 is secured to the evaporator coil 26 and the bottom leg is secured to the walls 48, 50 and 52 of the compartment section. The top side of the evaporator coil 26 is secured to the inner surface of top wall 58. Mounted in and passing through wall 60 of the blower compartment are blower fan motor assemblies 30 and 32. The blower fan motor assemblies each include a fan 78 which is driven by an electrically operated motor 80. The fan is connected to the motor via a shaft 82. The motor is also connected via shaft 82 to a squirrel cage 84 which is adjacent the evaporator coil 26. As best seen in FIG. 3, squirrel cage 84 is encompassed by a housing 86 which is secured to the wall 60. Housing 86 is cylindrically shaped and has a circular end wall 88 which has a hole 90 in the center thereof through which shaft 82 passes. At the other end of housing 86 is an annular end wall 92 having an opening 94 therein which enables communication of the squirrel cage 84 with the evaporator coil 26. Distribution hoses 34 and 36 extend through holes provided therefor in top wall 58 to the squirrel cage housings 86. The hoses 34 and 36 and fan blades 78 extend into the compartment section 42 of the case 22.

Compartment section 42 is generally rectangular and includes end walls 96 and 98, bottom wall 100, top wall 102, and side wall 104. Walls 96 and 98 are each rectangular and have a rectangular notch 106 in an upper corner thereof which are aligned with respect to each other. Top wall 102 is comprised of a pair of parallel horizontal elongated strips 108 and 110 which are spaced from each other by an integral vertical elongated strip 112. Strip 110 further includes a parallel ledge 114 which is vertically spaced from and below the main portion of strip 110 approximately the thickness of wall 102. Strip 110 further includes an arcuate notch 116 which is centrally located along its free edge and through ledge 114.

Figure 4:
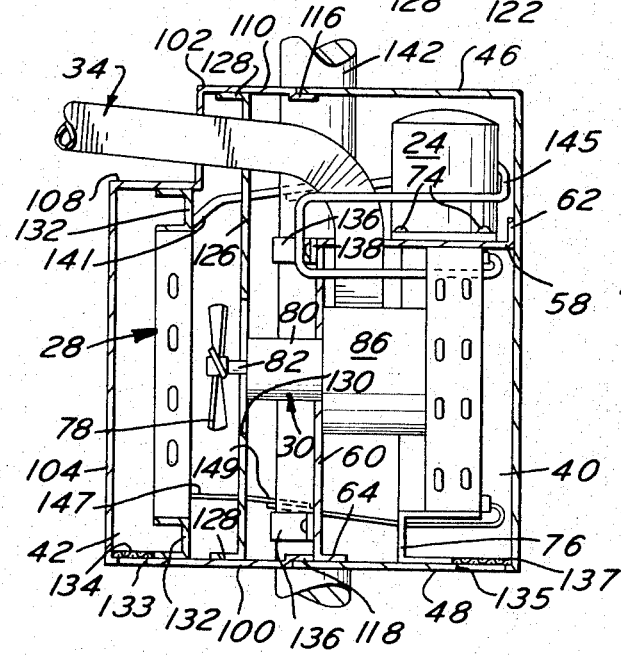
FIG. 4 is a sectional view of the air conditioning unit taken along the line 4—4 in FIG. 3.

As best seen in FIG. 4, wall 112 has a pair of holes through which hoses 34 and 36 pass. Side wall 104 is substantially rectangular and is integral with strip 108. Bottom wall 100 is substantially rectangular and has a horizontal ledge 118 which is substantially parallel to the major portion of wall 100 and which is vertically spaced from and above wall 100 approximately the thickness thereof. The wall 100 has an arcuate notch 120 along its free edge and through ledge 118 which is vertically aligned with notch 116. Secured to wall 96 are a pair of latches 122. Latches 122 are rectangular and each have a hole 124 at a forward portion thereof which are aligned with holes 55 of compartment section 40 when the compartments are closed together. The sections are closed together by inserting suitable fasteners through holes 124 and 55 and securing them therein.

A shroud 126 is mounted within compartment section 42. Shroud 126 is rectangular and includes a peripheral elongated flange 128. Flange 128 is perpendicular to the plane of shroud 126 and is secured at its top portion to strip 110 of top wall 102, is secured to bottom wall 100 at its bottom portion and is connected at its vertical portions to end walls 96 and 98. The shroud further includes a pair of circular openings 130 through which fans 78 extend when sections 40 and 42 are closed together as best seen in FIG. 4.

It should be noted that vertically extending hinge 54 is adjacent the plane of shroud 126. Thus, the compartments 40 and 42 pivot about an axis which is close to or in the plane of the shroud 126. This enables the circular openings 130 to be closer in diameter to the length of fan blades 78. Thus, when the fan blades 78 pass through openings 130 of shroud 126 when the compartments are closed together, the shroud 126 moves in a direction substantially parallel to the axis of shaft 82. Therefore, the closeness of the blades to the edge of opening 130 allows greater pressure to be built up in the compartment within shroud 126 and adjacent the condenser 28.

Condenser coil 28 is vertically mounted parallel to shroud 126. A U-shaped rail 132 secures condenser coil 28 within the section 42. U-shaped rail 132 extends peripherally about the condenser coil 28. The inner leg thereof is secured to the periphery of condenser coil 28 and the outer leg thereof is secured to walls 96 through 102. The compartment 42 further includes an opening 133 in the lower wall 100 of the compartment. Mounted adjacent the opening 133 is a filter 134 which extends longitudinally along the bottom wall 100 adjacent the opening 133. The filter 134 is preferably removably mounted so that it may be changed when it becomes unduly clogged. Compartment section 40 also includes a similar filtering system comprised of an elongated opening 135 which is best seen in FIG. 4 and an elongated filter 137 which is mounted within the compartment section 40 adjacent opening 135. Filter 137 is also preferably removably mounted so that it may be changed when it is clogged by the impurities filtered out of the air.

A pair of clamps 136 are connected to wall 60 of blower compartment 56. Clamps 136 are arcuately shaped and include a pair of integral planar tabs 138 at each end which are secured to wall 60 by fasteners 140.

The interconnections of the compressor, condenser, and evaporator are best seen in FIGS. 2 and 4. Compressor 24 is connected to condenser coil 28 via a pressure line 141 which extends from the compressor through shroud 126 to the condenser coil 28. The pressure line 141 is preferably an elongated tube 5/16" in diameter and includes a loop 143 which is located adjacent hinge 54 so that the pressure line will be adequately flexible to open and close the compartments. Compressor 24 is also connected to the evaporator 26 via a suction line 145 which extends from the compressor 24 around wall 58 and wall 60 to the evaporator coil 26. The suction line is preferably an elongated tube 3/8" in diameter.

The compressor and condenser are connected together by an expansion line 147 which is preferably an elongated tube 1/8" in diameter. Expansion line 147 extends from the compressor 28 through shroud 126, wall 60 and the web of U-shaped rail 76 to the evaporator coil 26. Expansion line 147 also includes a loop 149 which enables adequate flexibility for opening and closing of the compartments of air conditioning unit 20.

It should be understood that various modifications may be made. For instance, the pair of fan motor assemblies 30 and 32 may be replaced by a single fan motor assembly which alone would distribute cooled air through the pair of hoses 34 and 36. Further, distribution hoses 34 and 36 may be of a collapsible or accordian design so that they may retract within the two piece case as shown in FIG. 1 when not in use.

In operation, the air conditioning unit functions as a conventional Carnot-cycle refrigeration system. That is, a refrigeration fluid, such as Freon, is passed through a capillary tube from the condenser coil to the evaporator coil. As the refrigeration liquid is passed from the capillary tube to the evaporator coil, the refrigerant expands into a gaseous state by withdrawing heat from the surrounding environment. The squirrel cage fan 24 draws air through the evaporator coil 26 where it is cooled as the heat is withdrawn from the air and given to the refrigerant.

The vapor from the evaporator coil 26 is drawn to the compressor 24 via a suction line. The compressor compresses the vapor and forces it to the condenser coil 28 via a pressure line. The heat is removed from the refrigerant when it is transferred to the condenser coil and is transformed into a liquid. Air is forced past the condenser coil by the fans to remove heat from the refrigerant. The capillary tube which is connected to the condenser coil is used to meter the liquid to the evaporator coil.

Thus, the squirrel cage blowers 84 draw air through the evaporator coil 26 and force the cooled air through flexible distribution hoses 34 and 36. Distribution hoses 34 and 36 are connected to vehicles via window distribution and deflection units 38.

The air conditioning units 20 are each secured to speaker poles 142 which have a pair of speakers 144 as shown in FIG. 1. To secure the air conditioning unit 20 to a speaker pole, the compartments 40 and 42 are pivoted open and away from each other. Clamps 136 are removed and the air conditioning unit is placed adjacent speaker pole 142 so that notches 53 and arcuate channel 72 engage the pole. Clamps 136 are placed about the pole 142 and are secured to wall 60 of the blower compartment 56 and tightened to fixedly mount the unit 20 to the pole. Compartment section 42 is then pivoted to a closed position so that notches 116 and 120 engage pole 142 and holes 124 are aligned with holes 54. As best seen in FIG. 4, in this position, ledge 116 overlaps wall 46 and ledge 118 overlaps wall 48 of compartment section 40. Thus, the unit is sealed tightly together and is thereby weather-proofed. To additionally seal off the internal portion of the unit from the outside, a pair of annular rubber grommets may be placed about the speaker pole 142 prior to the placement of the air conditioning unit 20 on the pole. The grommets are so placed that they are engaged by notches 53, 116 and 118 to form a very tight seal.

As best seen in FIG. 1, the speaker poles are located between and adjacent to the parking spaces for a pair of vehicles 146 and 148. The distribution hoses 34 and 36 are connected to vehicles 146 and 148 via window distribution and deflection units 38.

The window distribution and deflection units 38 are best shown in FIG. 2 and are each comprised of a body portion 150 and a pair of sliding panels 152 and 154. Body portion 150, best shown in FIG. 5 and 5A, has a thick rectangular base 156, an elongated rectangular lower strip 158 and an elongated rectangular upper strip 160. Strips 158 and 160 are parallel to each other and are perpendicular to and integral with the base 156. Depending from strip 158 is an elongated track 161. Track 161 is integral with the strip 158 and acts as a guide for sliding panels 152 and 154. A plurality of bosses 162, 164, 166 and 168 are provided which depend from and are integral with strip 158 and track 161. Bosses 162, 164, 166 and 168 are rectangularly shaped and act to engage the upper edge of a vehicle's window as shown in FIG. 1. As best seen in FIGS. 5 and 5A, bosses 162 and 164 extend downwardly from the forward edge of track 161 and bosses 166 and 168 extend downwardly from the rear edge of track 161. Bosses 162 and 166 are laterally aligned with respect to each other as are bosses 164 and 168. Thus, bosses 162 and 164 engage the inner surface of the vehicle's window and bosses 166 and 168 engage the outer surface thereof.

Track 161 includes a rectangular notch 170 which is centrally located at its lower edge. Notch 170 is provided so that the clip or hook of the speakers 144 may be interfitted between the top edge of the window and the track 161.

Extending upwardly from strip 160 is a track 172.

Track 172 is elongated and extends longitudinally along the top surface of strip 160 and is integral therewith. Track 172 also acts as a guide for sliding panels 152 and 154. Track 172 includes an upwardly extending strip 173. Strip 173 extends along a central portion of track 172 and is integral therewith. Strip 173 acts to engage the upper portion of the window channel of the vehicle.

The base section 150 further includes a circularly shaped hole 174 through which the cooled air passes to the interior of the vehicle. A planar rectangular deflector 170 is mounted between strips 158 and 160 adjacent hole 174. It is, of course, understood that a plurality of deflectors can be used spaced from and mounted similarly to deflector 176; however, only a single deflector 176 is shown for the purpose of clarity. The deflector 176 includes a pair of integral vertically extending pins 178 and 180 at the top and bottom edge adjacent one side which are inserted into holes provided therefor on the inner surface of strips 158 and 160 of the body portion 150. Thus, pins 178 and 180 act as journals for deflector 176 so that it may be pivoted to vary the direction of the incoming conditioned air. Body portion 150 is connected to the distribution hoses 34 and 36 so that the core of a hose is aligned with hole 174. Hoses 34 and 36 include an annular flange 182 at the end thereof as shown in FIG. 5. Flange 182 is perpendicular to the axis of the hose and is secured to the base 156 of body portion 150 of the window distribution and deflection unit 38 by fasteners 184.

Sliding panels 152 and 154 are provided so that the major portion of the space between the upper edge of the window and the upper window channel may be closed off. That is, window panels 152 and 154 may be spaced from the center of the body portion 150 until the outer edges thereof abut the sides of the window frames. Sliding panels 152 and 154 each include a planar rectangular front wall 186 which is disposed vertically. An elongated track 188 extends longitudinally along the lower portion of wall 186. Track 188 comprises an elongated strip or leg 190 and a pair of arms 192 and 194 which are integral and perpendicular to leg 190. The leg 190 of track 188 is integral with wall 186 and is vertically spaced from the lower edge of wall 186 and parallel thereto. Arm 192 of track 188 in combination with the lower edge of wall 186 act to engage the upper edge of the window of a vehicle. The upwardly extending arm 194 in combination with the portion of wall 186 adjacent the lower edge act to slidably engage the guide track 161 of the body portion 150. Sliding panels 152 and 154 each further include a longitudinally extending flange 196 of L-shaped cross-section. L-shaped flange 196 includes a leg 198 which is integral with and perpendicular to the top edge of wall 186 and a longitudinally extending vertically disposed leg 200 which depends from leg 198 and is integral therewith. Leg 198 is perpendicular to leg 200 and wall 186. A longitudinally extending strip 202 is integrally secured to the top surface of leg 198. Strip 202 is disposed vertically and is centrally located with respect to the top surface of leg 198. Leg 200 in combination with the upper portion of wall 186 acts to slidably engage track 172. Strips 202 of the sliding panels 152 and 154 act to engage the sliding panels in the top window channel in combination with strip 173 of the body portion 150. In this manner, the window distribution and deflection unit 38 is maintained in place by means of the U-shaped channel formed by the bottom walls 186, legs 190 and arms 192 and bosses 162 through 168 which engage the top edge of the vehicle's window and strips 173 and 202 of body portion 150 and sliding panels 152 and 154, respectively, which engage the top channel of the window frame.

It should be noted that arm 192 of track 188 and bosses 162 through 168 which engage the upper edge of the window depend a substantial distance from the window distribution unit. Thus, when the window distribution unit is mounted on the window of a convertible or hard-top automobile, the lower channel is adequate to maintain the window distribution unit on the window without the aid of the upper tracks 202 and 173. Further, since the lower channel alone is able to maintain the unit 28 on the window, it is not necessary to tighten the window against the window distribution unit 38 and the upper channel of the window. Therefore, the door of the vehicle may be opened easily with the window distribution mounted thereon.

Sliding panels 152 and 154 further include handles 204 and 206, respectively. Handle 204 is mounted adjacent the rightmost edge of the wall 186 of the sliding panel 152, whereas handle 206 is mounted adjacent the leftmost edge of wall 186 of sliding panel 154. The handles 204 and 206 are of rectangular cross-section and extend vertically. Each is integral with the outer surface of wall 186. Handles 204 and 206 facilitate manual sliding of the sliding panels 152 and 154, respectively.

Thus, an air conditioning unit for a drive-in theater has been provided which is of a "suitcase" design. It is easily mounted to existing speaker poles by pivoting open the adjoining compartments, placing them about a speaker pole, and engaging them thereto by fastening clamps 136 about the speaker pole. The air conditioning units 20 require only electrical power at each of the speaker poles. That is, it is only necessary that an electrical receptacle be provided at each of the speaker poles 142 which may be attached to the electrical devices in the air conditioning units 20. As best seen in FIG. 1, electrical cables 208 are preferably installed in the drive-in theater connecting the speaker poles 142 to a centrally located power supply. The efficiency of this system is enhanced because the cooling of air is accomplished adjacent the vehicles which are to be cooled. It follows, that expensive installation of piping and insulation thereabout for cooling media is obviated as a result of these individual units.

An alternate air conditioning unit 210 embodying the invention is shown in FIGS. 6 through 8. The device 210 includes the same internal apparatus as that used in the "suitcase" unit 20. That is, device 210 also houses a conventional air conditioning system. The device 210 includes a rectangularly shaped upper compartment 212 which houses the compressor, evaporator and blower. The device 210 further includes a lower compartment 214 which is of a tapering rectangular cross-section that is largest at its tip and which is secured to the base of compartment 212. Compartment 214 houses the fan and condenser section as well as distribution hoses 216 and 218. The condenser is located adjacent a filter 219 which is removably secured to the outer wall of lower compartment 214. The compartments 212 and 214 have a common slot 220 which extends from the central vertical axis of the device 210 to the center of side 222 of the device. Slot 220 extends vertically from the top edge of the compartment 212 to the bottom edge of compartment 214. Slot 220 forms a U-shaped wall within the compartments. That is, slot 220 includes a pair of parallel vertically extending walls 224 and 226 and an arcuate end wall 228 which bridges the walls 224 and 226. As best seen in FIG. 8, walls 224 and 226 include openings 230 and 232, respectively. A similar pair of openings is provided closer to the bottom of the slot. Openings 230 and 232 are aligned with respect to each other.

A pair of U-shaped bolts 234 which are connected to clamps 236 secure the air conditioning unit 210 to speaker poles 142. The legs of U bolts 234 are threaded so that nuts 238 may be secured thereto and tighten the clamps 236 against the speaker poles 142. The clamp 236 is rectangularly shaped and includes a pair of openings which are aligned with the legs of bolt 234 and which enable the clamp to be telescoped thereover. By appropriately rotating the nuts 238, the clamp may be loosened or tightened. As best seen in FIG. 8, the upper clamp 236 passes through openings 230 and 232 and lower clamp 236 passes through similar openings provided adjacent the lower end of the slot 220.

The air conditioning unit 210 may be mounted on the speaker pole 142 by placing the slot 220 over the speaker pole until the pole is embraced by the arcuate wall 228 of the slot. The U bolt 234 is then placed about end wall 228 and clamp 236 is placed on the U bolt. The nuts 238 are tightened and clamps 236 are secured against the poles 142 thereby fixedly mounting the unit 210 to the speaker pole 142. The unit 210 provides cooled air to the adjacent vehicles via window distribution and deflection units which are secured at the ends of hoses 216 and 218.

Among the advantages of the air conditioning unit 210 are that it is one piece and there are no externally moving parts. The unit 210 is thus easily mounted on existing speaker poles and ready for operation in a short period of time.

Another air conditioning unit 240 embodying the invention is shown in FIGS. 9 through 11. Air conditioning unit 240 basically comprises a rectangularly shaped housing 242 which has an enlarged opening 244 which extends vertically through the housing. Opening 244 is large enough to pass over speakers which are mounted at the top of the speaker pole 142. Prior to the mounting of air conditioning unit 240 on a speaker pole 142, it is necessary to secure a post mount frame 246 thereto. Post mount frame 246 is comprised of similar half sections 248. Half sections 248 each include a planar semi-circular base 250 having a collar 252 which is concentrically mounted on the base 250 and which is semi-annular. Collars 252 have a pair of openings 254 which extend radially through the collar and through which a suitable fastener extends to secure the halves 248 of post mount frame 246 to the speaker pole 142. The air conditioning unit 240 is placed over the top of the speakers on the top of the pole until the top wall 256 rests on the post mount frame 246. The top wall 256 is concentrically aligned with the post mount frame and is secured thereto by fasteners 258 which pass through wall 256 and base sections 250. Cooled air is then provided to adjacent vehicles via distribution hoses 259.

It is thus seen that air conditioning unit 240 is also of a simple construction and facilitates easy mounting to an existing speaker pole in a drive-in theater. It is also seen that the air conditioning unit 240 may be mounted quickly and easily and be ready to operate with very little expense in installation.

Finally, an air conditioning unit 260 embodying the invention is shown in FIG. 12. Air conditioning unit 260 is designed for a drive-in theater which is presently being built. That is, the air conditioning unit 260 further includes, in addition to the conventional air conditioning system used in the unit 20, a pair of speakers 262 which are built into the unit. Unit 260 is basically rectangular and includes a pair of compartments 264 which are adapted to house the speakers 262. Speakers 262 are electrically connected to the unit 260 by conductors 265. The unit is preferably secured to the pole 266 prior to installation of the entire assembly in the drive-in theater premises. The air conditioning unit 260 may also be used where existing speakers and speaker poles are presently in disrepair and need replacing. The installation of unit 260 requires only the installation normally required for putting in the speaker poles alone. Distribution hoses 268 are provided to distribute cooled air to adjacent vehicles.

It is thus seen, that air conditioning units embodying the invention may be installed quickly and without requiring expensive excavation and without requiring a sizeable capital investment. The air conditioning units because they are individually operable need only be used for a vehicle which is parked adjacent thereto thereby requiring only a portion of the entire air conditioning system in the drive-in theater to be used on an "off" night. If the drive-in theater should not prove to be a profitable venture, the air conditioning units may be removed and used elsewhere.

Obviously many modifications and variations of the present invention are possible in the light of the above teachings. It is, therefore, to be understood that within the scope of the appended claims, the invention may be practiced otherwise than as specifically described.

What is claimed as the invention is:

1. In a drive-in theater a plurality of ground embedded spaced speaker poles, each including speaker units each of said speaker poles provided adjacent discrete locations of said theater at which vehicles may be parked, a plurality of spaced air cooling units, each of said air cooling units mounted on one of said speaker poles, said air cooling units each including a compressor, said units further including hoses for distribution of cooled air to the adjacent vehicles said hoses including a terminal member means adapted to fit into the windows of adjacent vehicles, said terminal means being solely supported and secured between the windows and window frames of said adjacent vehicles.

2. In a drive-in theater a plurality of spaced speaker poles, each including speaker units, a plurality of spaced air cooling units, each of said units mounted on one of said speaker poles, said units each including a compressor, said units further including means for distribution of cooled air to the adjacent vehicles, said air cooling units being comprised of a pair of compartments for housing said compressor, a condenser, an evaporator and a pair of fan motor assemblies, said compartments being pivotably mounted with respect to each other, each of said compartments further including an arcuate groove which extends vertically through the compartment, said arcuate grooves being complementary to each other and forming a circular opening when said compartments are closed together.

3. The invention of claim 2 and further including a pair of arcuate clamps, said clamps being secured to one of said compartments so that said air cooling unit may be secured to said speaker pole.

4. For use in a drive-in theater having a plurality of discrete locations at which vehicles may be parked, a plurality of spaced air conditioning units, each of said units being secured adjacent said discrete locations, each of said units including a self-contained refrigeration system, said units further including a plurality of hoses for distribution of cooled air to each of the vehicles adjacent said units said hoses including a terminal member means adapted to fit into the windows of adjacent vehicles, said terminal member means being solely supported and secured between the windows and the window frame of said adjacent vehicles.

5. In a drive-in theater a plurality of spaced speaker poles, each including speaker units, a plurality of spaced air cooling units, each of said units mounted on one of said speaker poles, said units each including a compressor, said units further including means for distribution of cooled air to the adjacent vehicles, said air cooling units being connected to said adjacent vehicles via air distribution hoses and window distribution units each connected at an end thereof, said window distribution units including a base section and a pair of sliding panels connected at opposite ends thereof so that said unit may be adjusted to the size of the opening of said window.

6. The invention of claim 5 wherein said base section includes a plurality of bosses at the lower edge thereof adapted to engage the top edge of a vehicle's window and an upwardly extending strip at the top edge thereof to engage the channel of the window frame, said sliding panels each including a U-shaped lower edge adapted to engage the upper edge of said window and an upwardly extending strip along the upper edge of said panel adapted to engage said channel of said window frame.

7. The invention of claim 5 wherein said base section further includes a notch along the lower edge thereof intermediate said pairs of bosses so that said speaker unit may be mounted between said window and said base.

8. The invention of claim 7 wherein said window distribution unit further includes a deflection means for varying the direction of cooled air provided by said cooling unit.

9. In a drive-in theater a plurality of spaced speaker poles, each including speaker units, a plurality of spaced air cooling units, each of said units mounted on one of said speaker poles, said units each including a compressor, said units further including means for distribution of cooled air to the adjacent vehicles, said air cooling unit including a vertically extending slot, and a pair of clamps, said unit being mounted on said speaker pole by placing said speaker pole in said slot and clamping said speaker pole to said air cooling unit.

10. In a drive-in theater a plurality of spaced speaker poles, each including speaker units, a plurality of spaced air cooling units, each of said units mounted on one of said speaker poles, said units each including a compressor, said units further including means for distribution of cooled air to the adjacent vehicles, said air cooling unit including a large cylindrical hole which extends vertically therethrough and further including a post mount frame, said post mount frame being secured to said speaker pole, said air conditioning unit being secured to said speaker pole by securing said unit to said post mount frame.

11. In a drive-in theater a plurality of spaced speaker poles, each including speaker units, a plurality of spaced air cooling units, each of said units mounted on one of said speaker poles, said units each including a compressor, said units further including means for distribution of cooled air to the adjacent vehicles, said air cooling unit including a pair of speakers, said speakers being integral with said air conditioning unit so that said air conditioning unit and said speaker system may be installed simultaneously.

References Cited

UNITED STATES PATENTS 3,008,401  11/1961  Cittadino _____ 98—2
3,090,382  5/1963  Fegan _____ 62—262

MEYER PERLIN, *Primary Examiner.*